(12) United States Patent
Lundblad

(10) Patent No.: US 10,164,420 B2
(45) Date of Patent: Dec. 25, 2018

(54) FASTENING DEVICE FOR A CABLE TERMINATION AND ARRANGEMENT COMPRISING FASTENING DEVICE AND CABLE TERMINATION

(71) Applicant: NKT HV Cables GmbH, Baden (CH)

(72) Inventor: Anders Lundblad, Alingsås (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/759,105

(22) PCT Filed: Aug. 30, 2016

(86) PCT No.: PCT/EP2016/070354
§ 371 (c)(1),
(2) Date: Mar. 9, 2018

(87) PCT Pub. No.: WO2017/042043
PCT Pub. Date: Mar. 16, 2017

(65) Prior Publication Data
US 2018/0287364 A1 Oct. 4, 2018

(30) Foreign Application Priority Data
Sep. 11, 2015 (EP) .................................... 15184766

(51) Int. Cl.
*H02G 15/06* (2006.01)
*H01R 4/70* (2006.01)
(Continued)

(52) U.S. Cl.
CPC .............. *H02G 15/06* (2013.01); *H01R 4/70* (2013.01); *H02G 1/14* (2013.01); *H02G 15/007* (2013.01); *H02G 15/22* (2013.01)

(58) Field of Classification Search
CPC .......... H02G 15/06; H02G 1/14; H02G 15/22; H01R 4/70
(Continued)

(56) References Cited

U.S. PATENT DOCUMENTS 5,252,780 A * 10/1993 Ramos .................. H01B 17/16
174/158 R

FOREIGN PATENT DOCUMENTS

| CH | 259577 A | 1/1949 |
|---|---|---|
| DE | 6810534 | 5/1969 |

(Continued)

OTHER PUBLICATIONS

European Search Report Application No. 15184766.2 Completed Date: Mar. 1, 2016; dated Mar. 11, 2016 8 pages.
(Continued)

*Primary Examiner* — Timothy Thompson
*Assistant Examiner* — Michael F McCallister
(74) *Attorney, Agent, or Firm* — Whitmyer IP Group LLC

(57) ABSTRACT

A fastening device is provided for fastening of a cable termination to a bracket. The fastening device includes a flange for attachment to the cable termination, the flange having a circumferentially extending groove; and one or more attachment members for fastening the fastening device to the bracket, each of the one or more attachment members being arranged such as to be slidable along the circumferentially extending groove. An arrangement including a cable termination and a fastening device is also provided.

14 Claims, 5 Drawing Sheets

(51) Int. Cl.
*H02G 1/14* (2006.01)
*H02G 15/007* (2006.01)
*H02G 15/22* (2006.01)

(58) Field of Classification Search
USPC ...................................................... 174/75 R
See application file for complete search history.

(56) References Cited

FOREIGN PATENT DOCUMENTS

| DE | 1540140 A1 | 12/1971 |
| EP | 0479469 A2 | 4/1992 |
| JP | 2014068442 A | 4/2014 |

OTHER PUBLICATIONS

International Preliminary Report on Patentability Application No. PCT/EP2016/070354 Completed Date: Aug. 2, 2017 6 pages.
International Search Report & Written Opinion of the International Searching Authority Application No. PCT/EP2016/070354 Completed Date: Oct. 27, 2016; dated Nov. 7, 2016 11 pages.

\* cited by examiner

FASTENING DEVICE FOR A CABLE TERMINATION AND ARRANGEMENT COMPRISING FASTENING DEVICE AND CABLE TERMINATION

TECHNICAL FIELD

The technology disclosed herein relates generally to the field of cable accessories and in particular to a fastening device for fastening of a cable termination.

BACKGROUND

An installation of a high power cable termination, for instance at a power substation, entails transporting various parts to the installation site, assembling the parts and then placing the assembled termination at its intended position. The assembling of the cable termination to the cable is often done on the ground and the cable termination then typically has a horizontal position. Such assembling of an outdoor cable termination may comprise various steps such as e.g. stripping a high voltage cable and providing it with insulation and stress-relief arrangements. The cable termination often has a vertical end position and the positioning therefore comprises lifting and turning the cable termination to this vertical position.

FIG. 1 illustrates installation of an outdoor cable termination 1 with connected high voltage cable 2. Fitting the assembled cable termination, which may weigh several hundreds of kilos, to its intended position in e.g. a frame structure is difficult for many reasons. The high voltage cable 2 to which the cable termination 1 is assembled is often bulky and stiff and thereby difficult to handle. It may further weigh several tenths of kilos per meter and require use of a crane for installation. The cable termination 1 with the connected cable 2 may, for instance, be lifted 20-30 meters to a vertical position where it should further be fitted into place and secured. Further, attachment points of the cable termination 1 may have to be in correct position to fit into corresponding holes at its intended position, e.g. pre-arranged holes in a frame structure or fixture. Several difficulties arise at such positioning; the cable termination 1 and high voltage cable 2 may rotate when being lifted from its horizontal assembling position to its vertical end position making the matching of attachment points and prearranged holes difficult. The weight of the cable termination and cable adds to the difficulties of fitting the attachment points to the receiving holes and also makes it cumbersome to make any required adjustments. The cable termination 1 may be damaged in this process, and could even be forced into place by the installers, which may result in unwanted damages and reduced operation safety. These difficulties are also a source of annoyance for the installers. Still another drawback is the time required for performing the installation making it time consuming and thereby costly. JP 2014068442 shows an example on a known fastening device comprising attachment members for fastening of a cable termination to a bracket.

SUMMARY

It is an objective of the invention to provide means for facilitating the installation of cable terminations and to solve or at least alleviate one or more of the above mentioned problems.

The objective is according to a first aspect achieved by a fastening device for fastening of a cable termination to a bracket. The fastening device comprises a flange for attachment to the cable termination, the flange comprising a circumferentially extending groove. The fastening device further comprises one or more attachment members for fastening the fastening device to the bracket. Each of the one or more attachment members are arranged such as to be slidable along the circumferentially extending groove.

The fastening device according to the invention enables a highly facilitated installation of a cable termination. By arranging the attachment members in a slidable manner in the circumferentially extending groove of the flange, an installer of the cable termination may easily rotate them to their respective intended positions.

In an embodiment, each of the one or more attachment members comprises a protrusion arranged in a slidable manner in the circumferential groove.

In an embodiment, the fastening device comprises a number of attachment members, wherein the number of attachment members matches requirements relating to size and/or rating of the cable termination. An advantage of this embodiment is that the same fastening device may be used for all sizes and/or ratings of cable terminations in a cost-efficient manner. For smaller cable terminations a fewer number of attachment members may be used than for larger cable terminations, and by adapting the number of attachment members to the actual requirements of the cable termination, cost savings can be made as there is no need for over-dimensioning for the "worst case". This is in contrast to prior art, wherein the fastening device is dimensioned for suiting the largest cable terminations, and has to be so dimensioned because of the fixed attachment points thereof.

In various embodiments, the flange comprises a disc-shaped first part with a through hole sized such as to circumferentially surround at least part of the cable termination.

In a variation of the above embodiment, the disc-shaped first part tapers at the through hole into a cylindrical second part, the cylindrical second part comprising a lip arranged for mechanical connection to a cable clamping member of the cable termination.

In various embodiments, each of the one or more attachment members comprises a clamping device having a through hole through which a fastening member may be driven for securing the fastening device to the bracket. The clamping device, e.g. a two part clamping device, is easy to attach to the groove of the flange and easy to adjust by sliding it along the groove. When the clamping device is at its intended position, it may be fasten to the bracket by, in the case of a two part clamping device, pressing the two parts together such that they press against each other and against the flange from opposite sides thereof and hold them together by means of a bolt or the like.

In various embodiments, each of the one or more attachment members comprises a position indication for alignment to one or more corresponding indications provided on the flange. This feature enables a further facilitated positioning of the fastening device and hence the cable termination to its intended position by providing a visual guidance for the installer when doing position adjustments of the fastening device.

In various embodiments, each of the one or more attachment members comprises a first clamping member and a second clamping member arranged on opposite sides of the flange.

In a variation of the above embodiment at least one of the first clamping member and the second clamping member comprises means for being slid along the circumferentially extending groove of the flange. Differently designed flanges may hence be used, e.g. adapted to particular applications, wherein the flange may have the groove on the upper side, the lower side or on both sides.

In various embodiments, the first clamping member and the second clamping member are provided with interlocking means for preventing relative movement between them.

The objective is according to a second aspect achieved by an arrangement comprising a cable termination and a fastening device according to any of the above embodiments. The fastening device is arranged in mechanical connection to the cable termination.

In an embodiment, the cable termination comprises a cable clamping member and the cable clamping member is mechanically connected to the flange of the fastening device and arranged to be rotatable in relation thereto. This feature provides an easy adjustment of the cable termination and/or the cable clamping member thereof in relation to the fastening device.

Further features and advantages of the embodiments of the present teachings will become clear upon reading the following description and the accompanying drawings.

DETAILED DESCRIPTION

Figure 1:
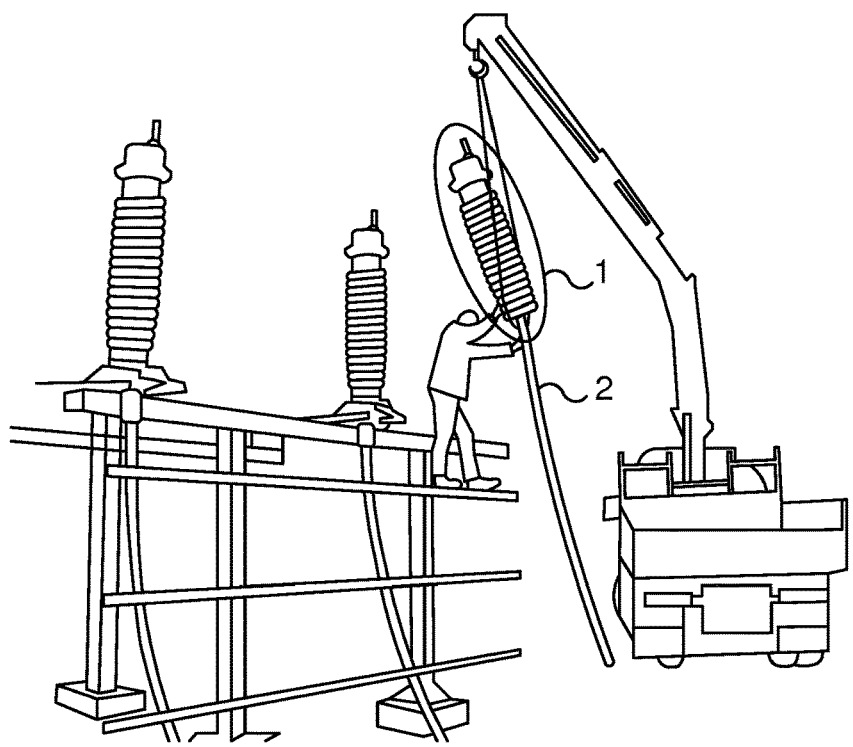
FIG. 1 illustrates an exemplary environment in which a termination may be installed.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
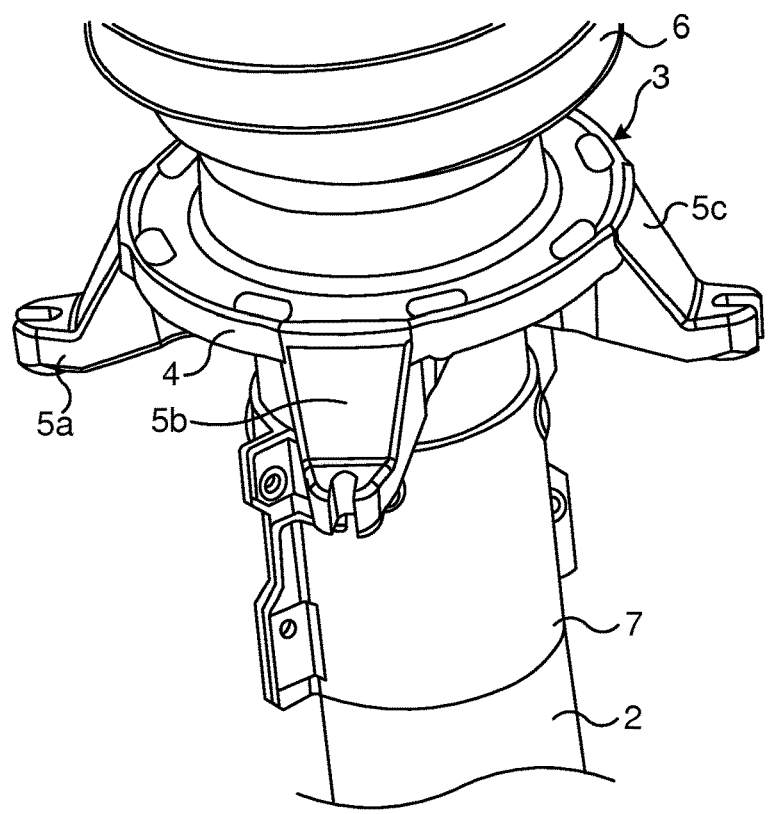
FIG. 2 illustrates a fastening device according to prior art.

FIG. 2 illustrates a fastening device according to prior art. The fastening device 3, in particular a flange mounting device 3, comprises a flange 4 with a number of attachment points 5a, 5b, 5c. The flange 4 is fastened to or part of a cable termination and arranged along the periphery of the cable termination. The fastening device 3 may, for instance, have three or four attachment points 5a, 5b, 5c fixedly arranged at the periphery of the flange 4 and enabling the fastening of the cable termination to its intended position. FIG. 2 also illustrates part of an insulator 6, which is a part of the cable termination, and a cable clamp 7 for securing the cable in a fixed position.

The attachment points 5a, 5b, 5c of the fastening device 3 are used for securing the cable termination for instance to a frame structure or rack (not illustrated) by means of bolts and nuts, or screws or the like. As mentioned in the background section, the cable termination with the connected cable 2 may, for instance, be fitted into position by matching holes of the attachment points 5a, 5b, 5c to corresponding holes at its intended position, e.g. prearranged holes in a frame structure or fixture. As also described in the background section, such fitting is difficult.

In contrast to the prior art fastening device 3 which has attachment points 5a, 5b, 5c that are fixed, the present invention suggests a fastening device comprising attachment points that are movable along a periphery of a flange thereof. The present invention thereby provides an improved fastening device compared to the above described fastening device 3 which will greatly facilitate the installation of a cable termination. An installer of a cable termination is enabled to simply move easily sliding attachment members to match corresponding holes of e.g. a frame structure in order to fasten e.g. the cable termination to the frame structure.

Figure 3:
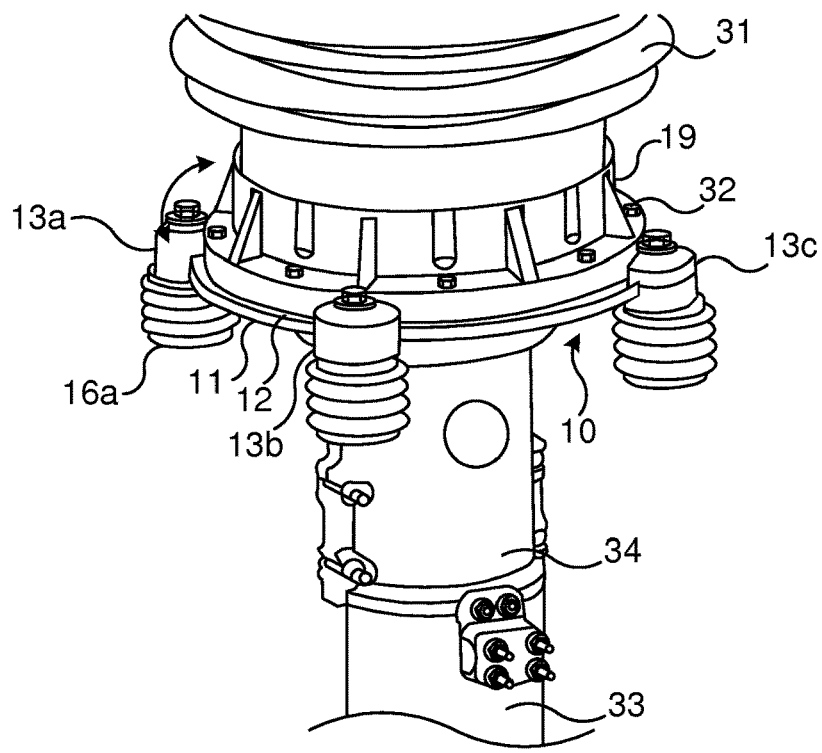
FIG. 3 illustrates an embodiment of a fastening device according to the present invention.

FIG. 3 illustrates an embodiment of the fastening device according to the present invention. In FIG. 3, parts of a cable termination are also illustrated, the details of which are not important for the present invention and therefore not described in any detailed manner. In the figure, part of an insulator 31 of the cable termination is illustrated. Such insulator 31 may for instance be a polymeric insulator or a porcelain insulator, and is illustrated as arranged in an end device 19. The end device 19 of the insulator 31 may be a metal end device, e.g. made of aluminum. Further illustrated in the figure are a cable 33, e.g. high voltage cable, and a cable clamping member 34, which may also be denoted cable clamp and may (but need not) be considered as being a part of the cable termination.

The fastening device 10 according to the invention, also denoted mounting flange 10, comprises a flange 11 and a number of attachment members, in the following also denoted clamping devices 13a, 13b, 13c. The flange 11 may be disc-shaped and/or have a cylindrical shape and can be attached to the cable termination in different ways. In FIG. 3, the flange 11 circumferentially surrounds the cable termination and is attached thereto, in particular the end device 19 thereof, by means of screws, one of which is indicated at reference numeral 32. It is noted that the flange 11 may be attached to such end device 19 of the cable termination by several alternative fastening means, e.g. bolt and nuts, rivets etc. It is also noted that the flange 11 may be fastened to the cable termination in other ways as well, besides by means of attachment to the end device 19.

The flange 11 comprises a circumferentially extending groove 12 at the outer part thereof, in particular close to the periphery thereof. The distance from the outer periphery of the flange 11 to the groove 12 may be adapted in view of the design of the clamping devices 13a, 13b, 13c, and in particular in view of that the clamping devices 13a, 13b, 13c should be able to slide along the groove 12. The flange 11 and the clamping devices 13a, 13b, 13c may for instance be made of a metal such as steel or aluminum, of a polymeric material or composite material, such as e.g. sheet moulding compound/bulk molding compound (SMC/BMC). The material should be selected so as to provide sufficiently strong fastening device, in conventional manner.

The clamping devices 13a, 13b, 13c are arranged such as to be slidable along the circumferentially extending groove 12 of the flange 11 as indicated by the double-headed arrow at the left-hand side of the figure. The clamping devices 13a, 13b, 13c can be slid along the groove 12 and the positioning of the cable termination is thereby facilitated; any adjustments needed are easily done by sliding the clamping devices 13a, 13b, 13c to their respective attachment positions. The clamping devices 13a, 13b, 13c may be slid to their intended positions, for instance such as to match corresponding holes in a structure, strut, brace, fixture, mounting rack or any type of holder to which the cable termination 30 is to be attached. In the following, such object for supporting the cable termination 30 is denoted bracket.

Figure 4:
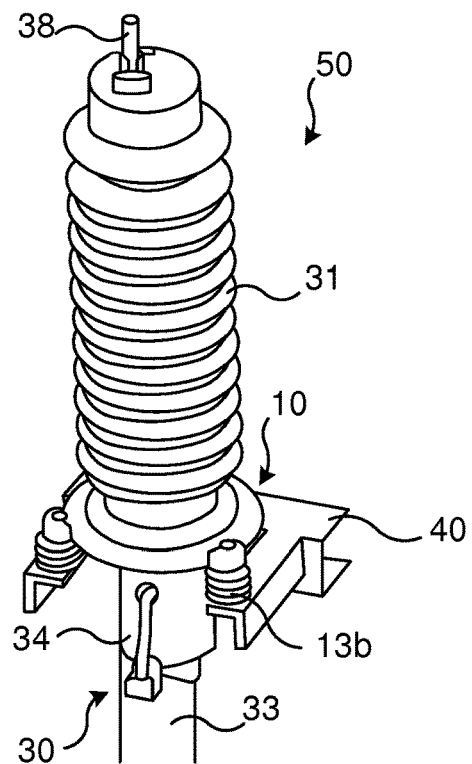
FIG. 4 illustrates an arrangement comprising a cable termination, a bracket and a fastening device according to the present invention.

FIG. 4 illustrates an arrangement 50 comprising a cable termination 30 and the fastening device 10 according to the present invention. The fastening device 10 is illustrated when being attached to a bracket 40, which in turn may be secured e.g. to a steel frame structure (not illustrated) to which the cable termination 30 is to be fastened. It is noted that the bracket 40 may be the structure (e.g. cantilever structure) to which the cable termination 30 is to be fastened. The cable termination 30 may comprise an insulator 31 and a cable clamping member 34, and also devices such as a top bolt 38 (illustrated in FIG. 4), top cover caps, conductor connectors etc., not explicitly illustrated in the figures. A part of a cable 33 is also illustrated.

It is noted that although the fastening device 10 and the cable termination 30 are described as separate parts, the fastening device 10 may, in other instances, be considered as part of the cable termination 30. Further, and as noted earlier, the details of the cable termination 30 as such are not important for the present invention.

Figure 5A:
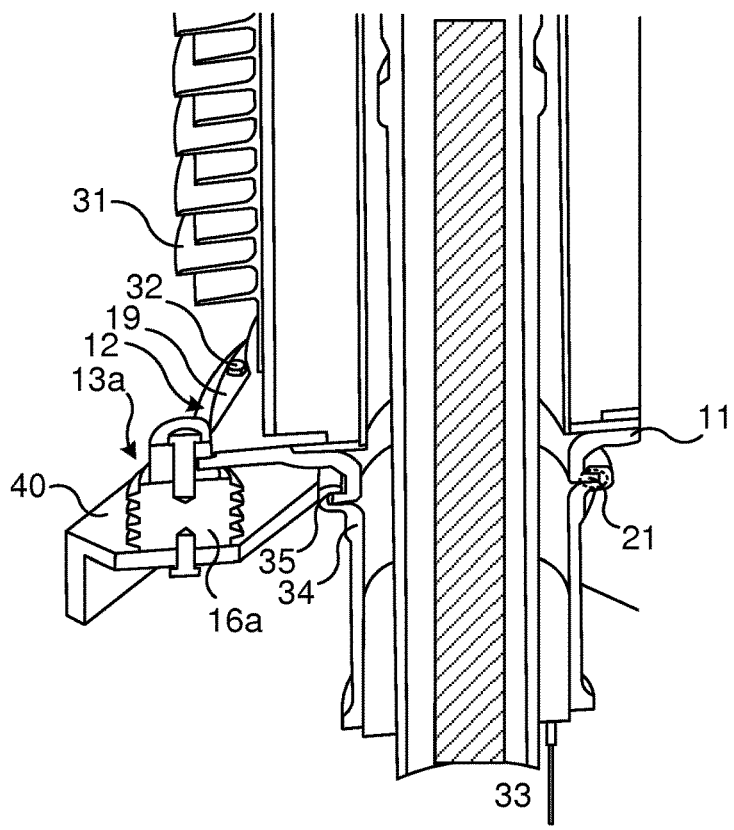
FIG. 5a illustrates an embodiment of a fastening device according to the present invention.

FIG. 5a illustrates an embodiment of the fastening device 10 according to the present invention. In particular, FIG. 5a is a cross-sectional view of the arrangement of FIG. 4 and illustrates the flange 11 attached by screws 32 to the end device 19 of the cable termination 30. In the illustrated embodiment the cable clamping member 34 has a lip receiving portion 35 facing inwardly towards the center of the cylindrical body of the cable clamping member 34. The lip receiving portion 35 is, in this embodiment, a circumferentially extending recess or groove, wherein the recess or groove faces inwardly towards the cable 33. The lip receiving portion 35 may extend along the entire circumference of the cable clamping member 34 or along a part or parts thereof.

Figure 6:
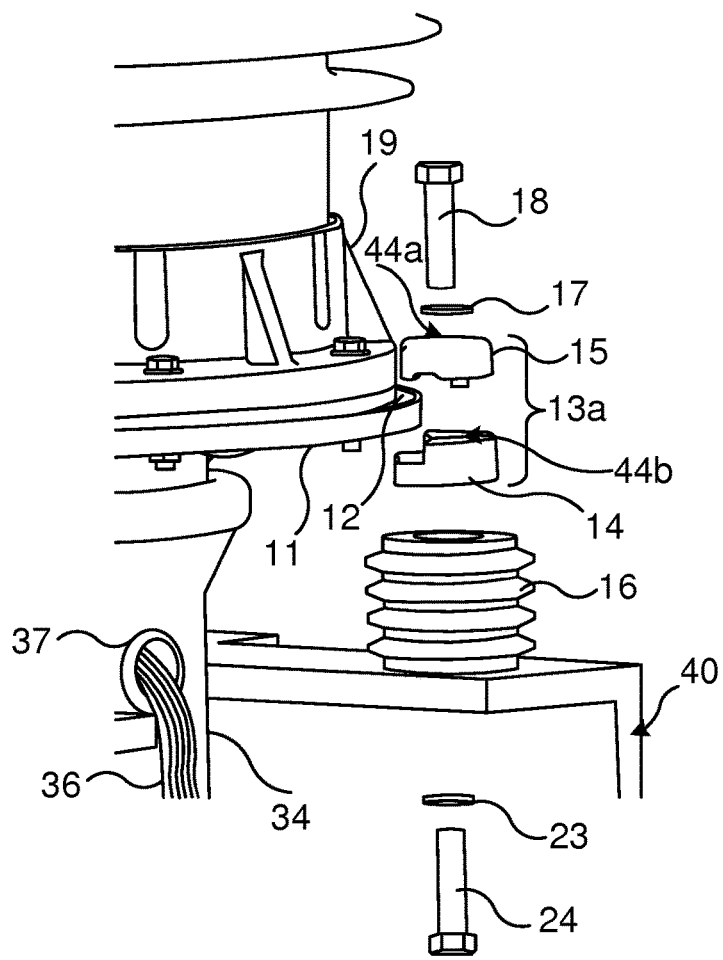
FIG. 6 illustrates an embodiment of an arrangement according to the present invention fastened to a bracket.

The clamping devices 13a, 13b, 13c of the fastening device 10 according to the invention secure the fastening device 10 and hence the cable termination 30 to the bracket 40 and are described more in detail with reference to FIG. 6.

Figure 5B:
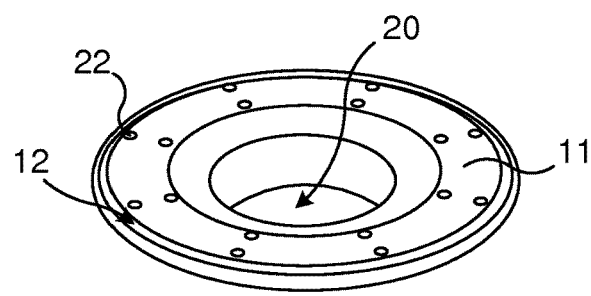
FIGS. 5b and 5c illustrate in different views an embodiment of a flange of a fastening device according to the present invention.
Figure 5C:
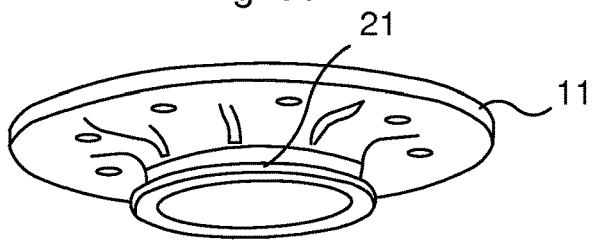

FIGS. 5b and 5c illustrate in different views the flange 11 of the fastening device 10 according to the present invention. The flange 11 may have a disc-shaped first part (which in the figures is the uppermost part) with a through hole 20 as illustrated in FIG. 5b, sized such as to fit around an outer periphery of a cable termination 30 of a desired diameter. The disc-shaped first part of the flange 11 may taper into a cylindrical second part (which in the figure is the lowermost part of the flange 11) ending in a curved inner portion. The cylindrical second part may be tapering with the largest diameter closest to the first part of the flange 11. The curved inner portion may be essentially u-shaped ending in a lip 21, which lip 21 may also be denoted flange protrusion. In FIG. 5a, the lip 21 is indicated at a circle. In the illustrated embodiment the lip 21 is directed outwardly, i.e. the lip 21 is essentially horizontal and arranged such as to be mechanically connectable to e.g. a cable clamping member 34 by being circumferentially surrounded by e.g. a recess of the cable clamping member 34. In other embodiments the lip 21 could be directed inwardly, whereby the lip 21 could be arranged in the mechanical connection by instead circumferentially surrounding such recess. The lip 21 may be essentially parallel to the disc-shaped first part of the flange 11. It is noted that the flange 11 may have other shapes as well. The flange 11 may, for instance, comprise a slip-on flange designed to slip over the outside of the cable of the cable termination 30 or over the end device 19 thereof, hence comprising only a circular disc of suitable thickness and having a through hole.

At installation, the lip 21 of the flange 11 may be fitted in the lip receiving portion 35 (e.g. groove) of the cable clamping member 34 as illustrated in FIG. 5a, providing a secure mechanical connection between them. The flange 11 is thus arranged between the end device 19 of the insulator 31 and the cable clamping member 34, which all circumferentially surrounds the cable 33. The cable termination 30 may thereby be fastened at its intended position by means of the fastening device 10.

The flange 11 may have a number of holes in the disc-shaped first part, one of which is indicated at reference numeral 22. The holes enable the fastening device 10 to be attached to, for instance, the end device 19 of the insulator 31 by means of screws, bolts or the like.

FIG. 6 illustrates in an exploded view the clamping device 13a of a fastening device 10 according to the present invention. The clamping device 13a may comprise a first (lower) clamping member 14 and a second (upper) clamping member 15 as illustrated in FIG. 6. In other embodiments, the clamping device 13a comprises a one-piece clamping device.

The first and second clamping members 14, 15 of the clamping device 13a are designed such that they can slide along the circumferentially extending groove 12 of the flange 11. The groove 12 may be provided at the outer part of the flange 11, in particular close to the periphery thereof, and the first and second clamping members 14, 15 may be designed accordingly. For instance, the second clamping member 15 may comprise a body with a protrusion, which protrusion is sized such as to fit in the groove 12 of the flange 11.

The first clamping member 14 and the second clamping member 15 may hence be arranged on opposite sides (upper and lower, respectively) of the disc-shaped first part of the flange 11, with e.g. a protrusion of the second clamping member 15 arranged in the groove 12. In some embodiments, the groove 12 may be arranged on the opposite surface than illustrated in the figures, i.e. the surface of the disc-shaped first part of the flange 11 that faces the second cylindrical part of the flange 11. In still some embodiments, both the upper and the lower surfaces of the disc-shaped first part of the flange 11 are provided with grooves (not illustrated). The first and second clamping members 14, 15 are then designed accordingly, e.g. both having protrusions arranged to be sliding in the respective groove.

The first and second clamping members 14, 15 comprising through holes (schematically indicated at reference numerals 44a and 44b) and arranged as described above may then be attached to the flange 11 by means of a first bolt 18 and a first washer 17 as illustrated in the FIG. 6. That is, the first bolt 18 is driven through the first washer 17, the through holes 44a, 44b of the second clamping member 15 and the first clamping member 14. A support insulator 16 may (but need not) also be provided between the first clamping member 14 and the bracket 40, in which case the first bolt 18 may be driven also at least partly into the support insulator 16. A second bolt 24 and a second washer 23 may be used to fixate the cable termination 30 to the bracket 40. In particular, when the clamping device 13a is at its intended position, e.g. in line with a corresponding hole of the bracket 40, the second bolt 24 is driven through the mounting bracket 40 and into the support insulator 16, thereby firmly fastening the cable termination 30 to the bracket 40. The first and second clamping members 14, 15 are thereby easily clamped together.

The cable clamping member 34 may be arranged to be rotatable in relation to the flange 11. Such feature still further facilitates the installation of the cable termination 30 by allowing any set of cables 36 (e.g. screen cables for connecting the cable 33 of the cable termination to ground) that may be arranged to go through a hole 37 of the cable clamping member 34, to be positioned as desired. FIG. 6 thus also illustrates part of the cable termination 30 (in particular part of an insulator thereof and cable clamp) fastened to a bracket 40 by means of the fastening device 10.

Figure 7:
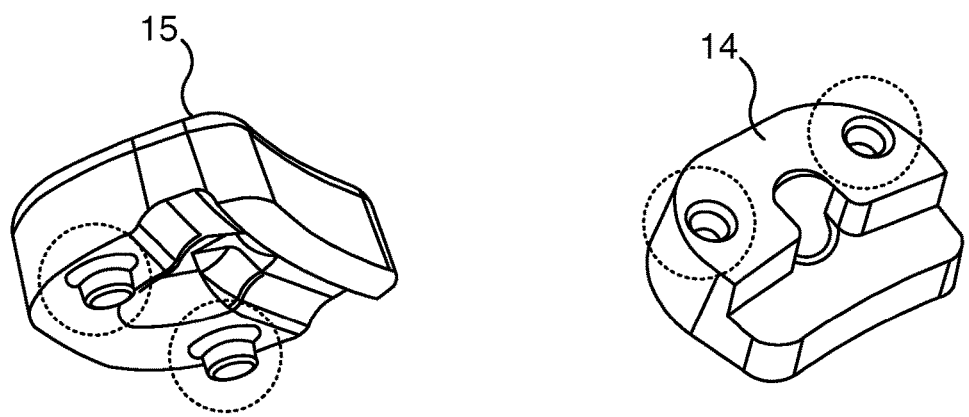
FIG. 7 illustrates an anti-rotation feature of a clamping device of a fastening device according to the present invention.

FIG. 7 illustrates a securing feature of the clamping device 13a of the fastening device 10 according to the present invention. The first and second clamping members 14, 15 of the clamping device 13a may be secured in relation to each other by an anti rotation feature. The second clamping member 15 (on left-hand side of figure) may be provided with one or more protruding pins (encircled by dashed line), while the first clamping member 14 (on right-hand side of figure) may be provided with the same number of receiving holes (encircled by dashed line), giving a firm mating connection (male-female). In other embodiments, the second clamping member 15 may be provided with receiving holes, while the first clamping member 14 is provided with protruding pins. In still other embodiments, the upper and lower clamp members 15, 14 are provided with other interlocking means providing the corresponding anti-rotation function, such as one of them comprising a protruding rim and the other a corresponding slot.

Figure 8:
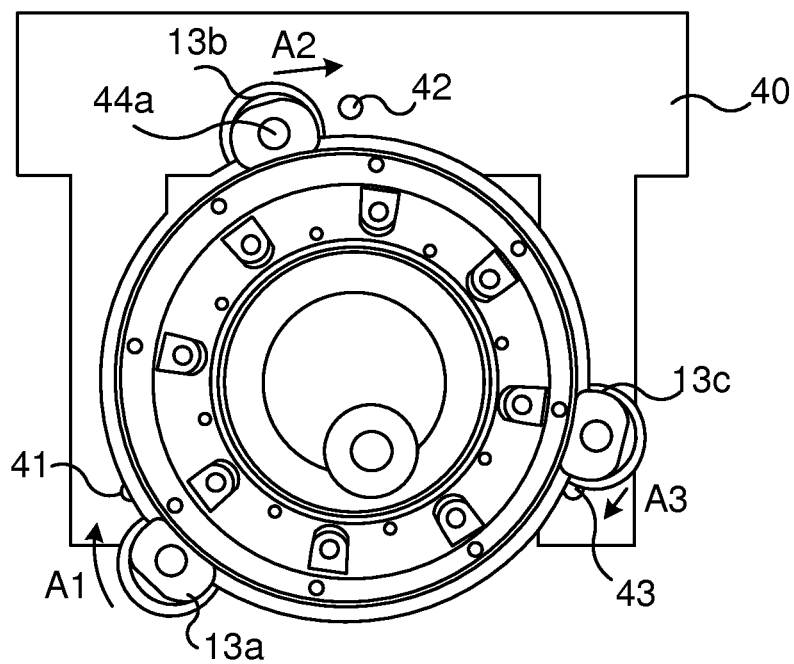
FIG. 8 illustrates adjustment of clamping devices of a fastening device according to the present invention.

FIG. 8 illustrates adjustment of the clamping devices 13a, 13b, 13c of a fastening device 10 according to the present invention. The bracket 40 may comprise a number of holes 41, 42, 43 by means of which the clamping devices 13a, 13b, 13c are to be fastened to the bracket 40. When lowering the cable termination 30 to the bracket 40, the position of one or more of the clamping devices 13a, 13b, 13c may be slightly wrong. Each clamping device 13a, 13b, 13c may then, according to the invention, be slid to its respective correct position. This is illustrated in FIG. 8 by the arrows A1, A2, A3, indicating in which direction the respective clamping device 13a, 13b, 13c should be moved in order to be slid to its correct position. The correct position in this case is such that the through holes 44a, 44b (through which the first and second bolts 18, 24 are driven as described above) of each clamping device 13a, 13b, 13c is aligned with the corresponding hole of the bracket 40. Thereby one or more bolts, e.g. first and second bolts 18, 24 (illustrated in FIG. 6), or other fastening means may be easily be mounted through the clamping devices 13a, 13b, 13c, the insulator device 16 and the bracket 40, whereby the cable termination 30 is secured to the bracket 40. It is noted that the clamping devices 13a, 13b, 13c may be adjusted individually before being fixated, e.g. by the bolts 18, 24.

The number of clamping devices 13a, 13b, 13c that is required to fulfil e.g. safety regulations may vary depending on the voltage rating and size of the cable termination 30. The same flange 11 may be used for different sizes of the cable termination 30, and the prior art fastening device 3 is therefore dimensioned for the "worst case", i.e. to fulfil requirements of the largest cable terminations and is hence over dimensioned for the smaller cable terminations. According to the present invention, the actual number of clamping devices 13a, 13b, 13c needed for fulfilment of regulations may be used. This is more cost-efficient compared to the prior art solution since less number of parts (clamping devices 13a, 13b, 13c) as well as installation time are needed.

Figure 9:
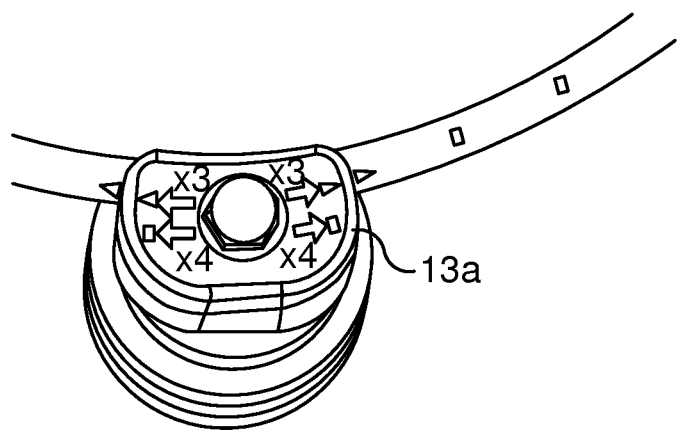
FIG. 9 illustrates an adjustment feature of a clamping device of a fastening device according to the present invention.

FIG. 9 illustrates an indication feature of the clamping devices 13a, 13b, 13c of the fastening device 10 according to the present invention. In the figure, markings "x3" as well as markings "x4" are provided on the clamping devices 13a, 13b, 13c (only one illustrated). The respective markings may indicate placement of the clamping devices 13a, 13b, 13c when 3 or 4 such clamping devices 13a, 13b, 13c are required. Corresponding markings on the flange 11 then renders the positioning of the clamping devices 13a, 13b, 13c to their respective positions easy. In this particular case, "x3" and "x4" may refer to the cases that 3 or 4 clamping devices are required. The clamping devices 13a, 13b, 13c as well as the flange 11 may comprise markings indicating both the case when three clamping devices are used and the case when four clamping devices are used. In FIG. 9, the flange 11 and the clamping device are illustrated as comprising markings in the form of triangles for the case of three clamping devices, and when, during the adjusting, the triangle of a clamping device overlap the triangle of the flange 11, then the correct position has been found. Correspondingly, for the case of four clamping devices the correct positions may, as illustrated, be indicated by squares. The markings may be any type of indication making the adjustment easier and from the above description the principles of this feature are clear.

The inventive fastening device 10 has been described in relation to a cable termination 30, i.e. for fastening of a cable termination. It is however noted that the fastening device 10 is well suited also for fastening of various other high voltage devices, in particular bulky and weighty devices, which are cumbersome to handle and fit into place.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A fastening device for fastening of a cable termination to a bracket, the fastening device wherein comprising:
   a flange for attachment to the cable termination, the flange including a disc-shaped first part with a through hole sized such as to circumferentially surround at least part of the cable termination, and a circumferentially extending groove, and
   one or more attachment members for fastening the fastening device to the bracket, wherein each of the one or more attachment members includes a protrusion arranged in a slidable manner in the circumferentially extending groove, and wherein each of the one or more attachment members includes a clamping device having a through hole through which a fastening member may be driven for securing the fastening device to the bracket.

2. The fastening device according to claim 1, including a number of attachment members, wherein the number of attachment members matches requirements relating to size and/or rating of the cable termination.

3. The fastening device according to claim 1, wherein the disc-shaped first part tapers at the through hole into a cylindrical second part, the cylindrical second part including a lip arranged for mechanical connection to a cable clamping member of the cable termination.

4. The fastening device according to claim 1, wherein each of the one or more attachment members includes a position indication for alignment to one or more corresponding indications provided on the flange.

5. The fastening device according to claim 1, wherein each of the one or more attachment members includes a first clamping member and a second clamping member arranged on opposite sides of the flange.

6. The fastening device according to claim 5, wherein at least one of the first clamping member and the second clamping member includes means for being slid along the circumferentially extending groove of the flange.

7. The fastening device according to claim 5, wherein the first clamping member and the second clamping member are provided with interlocking means for preventing relative movement between them.

8. An arrangement including a cable termination and a fastening device according to claim 1, wherein the fastening device is arranged in mechanical connection to the cable termination.

9. The arrangement according to claim 8, wherein the cable termination includes a cable clamping member and wherein the cable clamping member is mechanically connected to the flange of the fastening device and arranged to be rotatable in relation thereto.

10. The fastening device according to claim 2, wherein the disc-shaped first part tapers at the through hole into a cylindrical second part, the cylindrical second part including a lip arranged for mechanical connection to a cable clamping member of the cable termination.

11. The fastening device according to claim 2, wherein each of the one or more attachment members includes a position indication for alignment to one or more corresponding indications provided on the flange.

12. The fastening device according to claim 2, wherein each of the one or more attachment members includes a first clamping member and a second clamping member arranged on opposite sides of the flange.

13. The fastening device according to claim 6, wherein the first clamping member and the second clamping member are provided with interlocking means for preventing relative movement between them.

14. An arrangement including a cable termination and a fastening device according to claim 2, wherein the fastening device is arranged in mechanical connection to the cable termination.

* * * * *